United States Patent
Peddada et al.

(10) Patent No.: US 12,554,380 B2
(45) Date of Patent: Feb. 17, 2026

(54) COMPONENT SELECTOR FOR USER INTERFACES WITH DYNAMIC IDENTIFIERS

(71) Applicant: ServiceNow, Inc., Santa Clara, CA (US)

(72) Inventors: Sathi Babu Peddada, Hyderabad (IN); Akash Kumar, Hyderabad (IN); Karthik Macherla, Hyderabad (IN); Hari Teja Varma Jampana, Hyderabad (IN); Ravindra Sunkaranam, Hyderabad (IN); Aditya Ramamurthy, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 255 days.

(21) Appl. No.: 18/469,345

(22) Filed: Sep. 18, 2023

(65) Prior Publication Data
US 2025/0094027 A1    Mar. 20, 2025

(51) Int. Cl.
*G06F 3/04842*    (2022.01)
*G06F 3/0483*    (2013.01)

(52) U.S. Cl.
CPC ........ *G06F 3/04842* (2013.01); *G06F 3/0483* (2013.01)

(58) Field of Classification Search
CPC .. G06F 3/04842; G06F 3/0483; G06F 3/0481; G06F 3/048; G06F 8/38; G06F 9/451
See application file for complete search history.

(56) References Cited

U.S. PATENT DOCUMENTS

| | | |
|---|---|---|
| 4,941,084 A | 7/1990 | Terada |
| 5,185,860 A | 2/1993 | Wu |
| 5,237,518 A | 8/1993 | Sztipanovits |
| 5,261,097 A | 11/1993 | Saxon |
| 5,265,252 A | 11/1993 | Rawson, III |
| 5,367,685 A | 11/1994 | Gosling |
| 5,390,297 A | 2/1995 | Barber |
| 5,442,791 A | 8/1995 | Wrabetz |

(Continued)

FOREIGN PATENT DOCUMENTS

| | | |
|---|---|---|
| EP | 0433979 A2 | 6/1991 |
| EP | 1607824 A2 | 12/2005 |

(Continued)

OTHER PUBLICATIONS

Provarx, Page Object Locators, downloaded from Internet Jun. 17, 2023, https://www.provartesting.com/documentation/page-objects/provarx/.

*Primary Examiner* — Jeanette J Parker
(74) *Attorney, Agent, or Firm* — McDonnell Boehnen Hulbert & Berghoff LLP

(57) ABSTRACT

A method includes obtaining an indication of a user interface (UI) component of a user interface, and determining an association between the UI component and a dynamic identifier. The method also includes, based on determining the association, determining one or more static properties of one or more parent UI components of the UI component, and generating a component selector for the UI component based on the one or more static properties. The method further includes outputting the component selector for the UI component.

20 Claims, 13 Drawing Sheets

(56) References Cited

U.S. PATENT DOCUMENTS

| | | |
|---|---|---|
| 5,452,415 A | 9/1995 | Hotka |
| 5,522,042 A | 5/1996 | Fee |
| 5,533,116 A | 7/1996 | Vesterinen |
| 5,655,081 A | 8/1997 | Bonnell |
| 5,659,736 A | 8/1997 | Hasegawa |
| 5,671,412 A | 9/1997 | Christiano |
| 5,696,701 A | 12/1997 | Burgess |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke |
| 5,887,139 A | 3/1999 | Madison, Jr. |
| 5,909,217 A | 6/1999 | Bereiter |
| 5,937,165 A | 8/1999 | Schwaller |
| 5,949,976 A | 9/1999 | Chappelle |
| 5,978,594 A | 11/1999 | Bonnell |
| 6,021,437 A | 2/2000 | Chen |
| 6,041,347 A | 3/2000 | Harsham |
| 6,088,717 A | 7/2000 | Reed |
| 6,101,500 A | 8/2000 | Lau |
| 6,128,016 A | 10/2000 | Coelho |
| 6,131,118 A | 10/2000 | Stupek, Jr. |
| 6,134,581 A | 10/2000 | Ismael |
| 6,138,122 A | 10/2000 | Smith |
| 6,148,335 A | 11/2000 | Haggard |
| 6,166,732 A | 12/2000 | Mitchell |
| 6,167,448 A | 12/2000 | Hemphill |
| 6,175,866 B1 | 1/2001 | Holloway |
| 6,175,878 B1 | 1/2001 | Seaman |
| 6,260,050 B1 | 7/2001 | Yost |
| 6,263,457 B1 | 7/2001 | Anderson |
| 6,272,150 B1 | 8/2001 | Hrastar |
| 6,336,138 B1 | 1/2002 | Caswell |
| 6,363,421 B2 | 3/2002 | Barker |
| 6,393,386 B1 | 5/2002 | Zager |
| 6,397,245 B1 | 5/2002 | Johnson, II |
| 6,434,626 B1 | 8/2002 | Prakash |
| 6,438,592 B1 | 8/2002 | Killian |
| 6,456,306 B1 | 9/2002 | Chin |
| 6,466,932 B1 | 10/2002 | Dennis |
| 6,487,590 B1 | 11/2002 | Foley |
| 6,505,248 B1 | 1/2003 | Casper |
| 6,526,442 B1 | 2/2003 | Stupek, Jr. |
| 6,621,823 B1 | 9/2003 | Mellquist |
| 6,707,795 B1 | 3/2004 | Noorhosseini |
| 6,742,015 B1 | 5/2004 | Bowman-Amuah |
| 6,763,380 B1 | 7/2004 | Mayton |
| 6,816,898 B1 | 11/2004 | Scarpelli |
| 6,895,586 B1 | 5/2005 | Brasher |
| 6,948,175 B1 | 9/2005 | Fong |
| 6,985,901 B1 | 1/2006 | Sachse |
| 7,003,564 B2 | 2/2006 | Greuel |
| 7,028,228 B1 | 4/2006 | Lovy |
| 7,043,537 B1 | 5/2006 | Pratt |
| 7,043,661 B2 | 5/2006 | Valadarsky |
| 7,062,683 B2 | 6/2006 | Warpenburg |
| 7,096,459 B2 | 8/2006 | Keller |
| 7,146,574 B2 | 12/2006 | Goldthwaite |
| 7,197,466 B1 | 3/2007 | Peterson |
| 7,215,360 B2 | 5/2007 | Gupta |
| 7,216,304 B1 | 5/2007 | Gourdol |
| 7,222,147 B1 | 5/2007 | Black |
| 7,281,170 B2 | 10/2007 | Taylor |
| 7,412,502 B2 | 8/2008 | Fearn |
| 7,505,872 B2 | 3/2009 | Keller |
| 7,593,013 B2 | 9/2009 | Agutter |
| 7,596,716 B2 | 9/2009 | Frost |
| 7,617,073 B2 | 11/2009 | Trinon |
| 7,660,731 B2 | 2/2010 | Chaddha |
| 7,676,294 B2 | 3/2010 | Baier |
| 7,676,437 B2 | 3/2010 | Satkunanathan |
| 7,840,490 B1 | 11/2010 | Sellers |
| 7,877,783 B1 | 1/2011 | Cline |
| 7,890,869 B1 | 2/2011 | Mayer |
| 7,966,398 B2 | 6/2011 | Wiles, V |
| 8,060,396 B1 | 11/2011 | Bessler |
| 8,196,210 B2 | 6/2012 | Sterin |
| 8,321,948 B2 | 11/2012 | Robinson |
| 8,407,669 B2 | 3/2013 | Yee |
| 8,554,750 B2 | 10/2013 | Rangarajan |
| 8,595,647 B2 | 11/2013 | Sabin |
| 8,620,818 B2 | 12/2013 | Hughes |
| 8,646,093 B2 | 2/2014 | Myers |
| 8,674,992 B2 | 3/2014 | Poston |
| 8,725,647 B2 | 5/2014 | Disciascio |
| 9,053,460 B2 | 6/2015 | Gilbert |
| 9,069,737 B1 | 6/2015 | Kimotho |
| 9,971,826 B1 | 5/2018 | Belmar |
| 10,673,963 B1 | 6/2020 | Feiguine |
| 10,749,943 B1 | 8/2020 | Feiguine |
| 10,771,344 B2 | 9/2020 | Bitterfeld |
| 10,824,650 B2 | 11/2020 | Bar Oz |
| 10,944,654 B2 | 3/2021 | Rimar |
| 10,999,152 B1 | 5/2021 | Bar Oz |
| 11,025,481 B1 | 6/2021 | Louca |
| 11,089,115 B2 | 8/2021 | Garty |
| 11,095,506 B1 | 8/2021 | Erblat |
| 11,227,098 B2 | 1/2022 | Mendez |
| 11,275,580 B2 | 3/2022 | Tamir |
| 11,277,475 B2 | 3/2022 | Tal |
| 11,281,442 B1 | 3/2022 | Tal |
| 11,294,666 B1 | 4/2022 | Look |
| 11,296,922 B2 | 4/2022 | Leibkowiz |
| 11,301,503 B2 | 4/2022 | Burli |
| 11,379,089 B2 | 7/2022 | Goswami |
| 11,451,573 B2 | 9/2022 | Waplington |
| 11,470,107 B2 | 10/2022 | Waplington |
| 11,582,106 B2 | 2/2023 | Hameiri |
| 11,616,690 B2 | 3/2023 | Feiguine |
| 11,630,717 B2 | 4/2023 | Vutukuru |
| 11,632,303 B2 | 4/2023 | Bitterfeld |
| 11,640,369 B2 | 5/2023 | Bhogle |
| 11,671,444 B2 | 6/2023 | Waplington |
| 11,695,641 B2 | 7/2023 | Bar Oz |
| 2002/0116340 A1 | 8/2002 | Hellberg |
| 2002/0133584 A1 | 9/2002 | Greuel |
| 2002/0158969 A1 | 10/2002 | Gupta |
| 2003/0118087 A1 | 6/2003 | Goldthwaite |
| 2003/0200293 A1 | 10/2003 | Fearn |
| 2005/0015217 A1 | 1/2005 | Weidl |
| 2005/0091356 A1 | 4/2005 | Izzo |
| 2006/0026453 A1 | 2/2006 | Frost |
| 2006/0095461 A1 | 5/2006 | Raymond |
| 2006/0179058 A1 | 8/2006 | Bram |
| 2006/0288053 A1 | 12/2006 | Holt |
| 2006/0293942 A1 | 12/2006 | Chaddha |
| 2007/0033279 A1 | 2/2007 | Battat |
| 2007/0188494 A1 | 8/2007 | Agutter |
| 2007/0288389 A1 | 12/2007 | Vaughan |
| 2008/0133289 A1 | 6/2008 | Armour |
| 2008/0148253 A1 | 6/2008 | Badwe |
| 2008/0319779 A1 | 12/2008 | Hughes |
| 2009/0088875 A1 | 4/2009 | Baier |
| 2009/0228984 A1 | 9/2009 | Sterin |
| 2010/0110932 A1 | 5/2010 | Doran |
| 2013/0283273 A1 | 10/2013 | Miyazaki |
| 2013/0298013 A1* | 11/2013 | Hunter .................. G06F 40/137 715/243 |
| 2014/0122427 A1 | 5/2014 | Dary |
| 2014/0181788 A1* | 6/2014 | Sullivan .................. G06F 8/38 717/109 |
| 2017/0249287 A1* | 8/2017 | Thayer .................. G06F 40/143 |
| 2018/0123940 A1 | 5/2018 | Rimar |
| 2019/0073257 A1 | 3/2019 | Dasgupta |
| 2019/0104398 A1 | 4/2019 | Owen |
| 2019/0129739 A1 | 5/2019 | Al Reza |
| 2019/0149515 A1 | 5/2019 | Sharma |
| 2019/0165957 A1 | 5/2019 | Abbott |
| 2019/0342162 A1 | 11/2019 | Bendre |
| 2020/0034462 A1 | 1/2020 | Narayanasamy |
| 2020/0050689 A1 | 2/2020 | Tal |
| 2020/0204443 A1 | 6/2020 | Bar Oz |
| 2020/0301678 A1 | 9/2020 | Burman |

(56) References Cited

U.S. PATENT DOCUMENTS

2021/0097168 A1    4/2021  Patel
2021/0194764 A1    6/2021  Badyan
2024/0419438 A1*  12/2024  Zhao .......................... G06F 8/20

FOREIGN PATENT DOCUMENTS

WO        9934285  W    7/1999
WO        0052559  W    9/2000
WO        0179970  W   10/2001

* cited by examiner

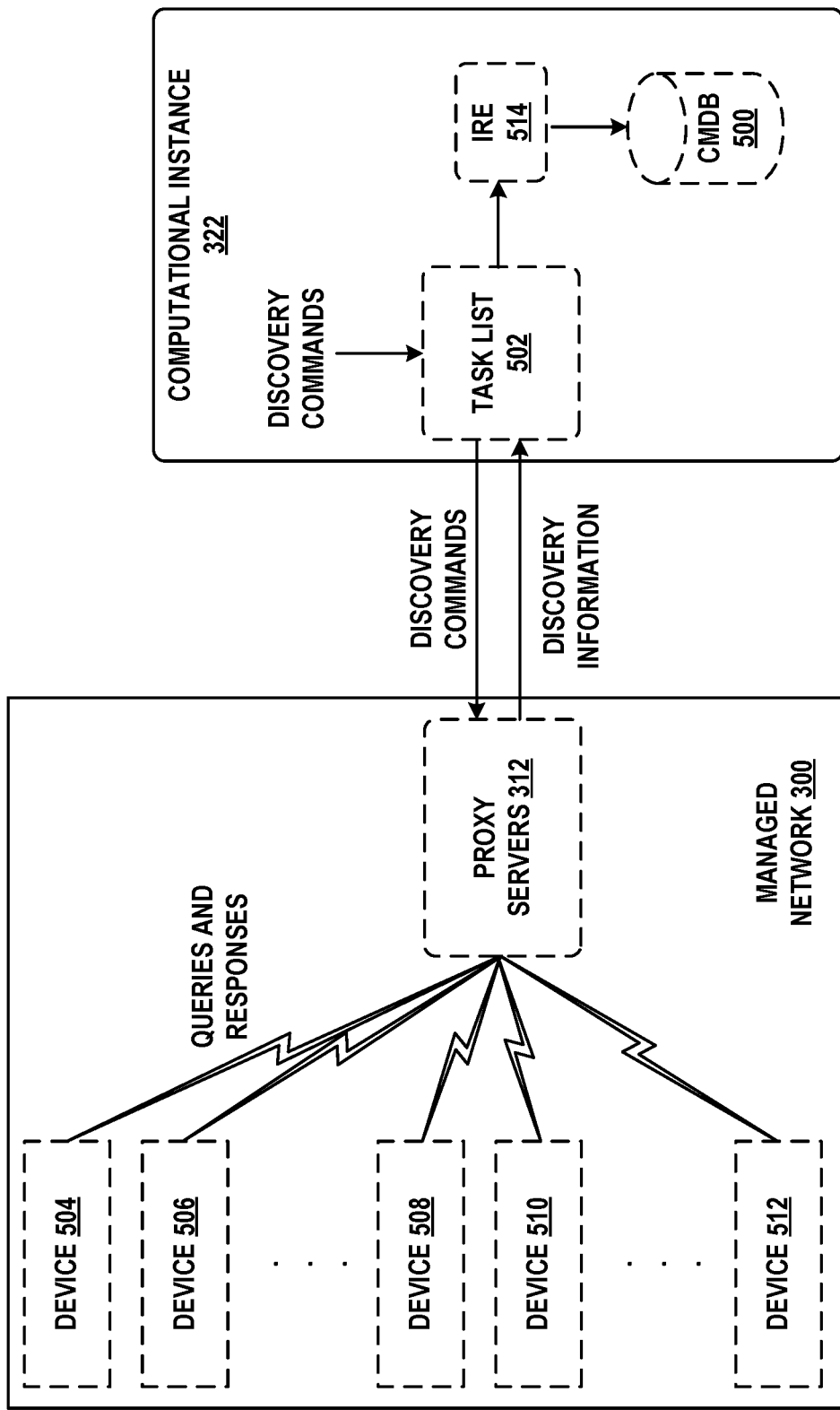

COMPONENT SELECTOR FOR USER INTERFACES WITH DYNAMIC IDENTIFIERS

BACKGROUND

A user interface (UI) component of a user interface may be assigned an identifier that changes over time even as the UI component itself remains unchanged, and thus cannot be used to generate a consistent, unique component selector for the UI component. Accordingly, it is desirable to determine a component selector that allows for reliable identification of a UI component regardless of whether the identifier thereof remains constant or changes over time.

SUMMARY

Various implementations disclosed herein include determining a component selector for a user interface (UI) component of a UI, such as the UI of a web page. Here, a component selector may be a text string, bit string, or some other indicator that allows a given UI component to be repeatably, consistently, and/or uniquely identified within different instantiations (e.g., renderings) of the UI. The component selector may be determined without dependence on dynamic portions of an identifier of the UI component, and may thus be used to identify the UI component regardless of whether the UI component is associated with a static identifier, a dynamic identifier, or a combination thereof. For example, the component selector may be used to identify a UI component of a UI generated using a UI framework that assigns dynamic identifiers to UI components. The UI framework may be configured to provide a graphical UI editor that allow users to define the UI, and the assignment of dynamic identifiers to UI components may facilitate reuse of the UI components across different UIs.

In some implementations, a component selector system may obtain an indication of the UI component for which to generate a component selector based on, for example, user selection of the UI component from the UI. The component selector system may determine, based on one or more attributes of the UI (e.g., URL associated with a web page that provides the UI), that UI components thereof are associated with dynamic identifiers that are configured to change across renderings of the UI. Based on determining that the UI components of the UI are associated with dynamic identifiers, the component selector system may be configured to determine static properties of the UI component and one or more parent components thereof, and may use the static properties to generate the component selector that remains constant across renderings of the UI. The component selector may be used, for example, to define and play back a guided tour of the UI.

The static properties may include (i) an active screen identifier of a screen of the UI that is actively displayed by the UI, (ii) a macroponent identifier of a macroponent that contains the UI component, (iii) a compositional identifier of a compositional element of which the UI component is a subset, and/or (iv) a static identifier of the UI component. The component selector may be generated by combining (e.g., transforming and/or concatenating) the static properties according to a predetermined pattern, resulting in a component selector that uniquely identifies the UI component at least within a context of the UI, including across different renderings thereof.

The UI may include a plurality of screens each of which may be individually displayable in a content display portion of the UI. The active screen identifier may indicate to which of the plurality of screens the UI component belongs, thus preventing the component selector from simultaneously specifying multiple instantiations of the UI component present as part of different screens. The macroponent that contains the UI component may be a UI object that specifies a composition of contents of at least part of the UI. For example, multiple macroponents may be used to define different portions of a respective screen of the plurality of screens. The macroponent identifier may thus locate the UI component within a subset of the respective screen.

The compositional element may be a UI component added to the UI by the UI framework to facilitate control over the look and feel of the UI. Compositional elements may be identified by a predefined string assigned thereto by the UI framework, and may provide an intermediate reference for locating the UI component. The compositional element may be a parent of the UI component and a child of the macroponent, and the compositional identifier may thus further narrow down the search space for the UI component to a smaller subset of the UI. The static identifier of the UI component may represent a type of the UI component. The static identifier may remain constant over time, but may be shared by multiple instantiations of the UI component throughout the UI. However, when two or more of the static properties are used in combination, a component selector may be generated that uniquely identifies the UI component at least within a context of the UI.

Accordingly, a first example embodiment may involve obtaining an indication of a UI component of a user interface, and determining an association between the UI component and a dynamic identifier. The first example embodiment may also involve, based on determining the association, determining one or more static properties of one or more parent UI components of the UI component. The first example embodiment may additionally involve generating a component selector for the UI component based on the one or more static properties, and outputting the component selector for the UI component.

A second example embodiment may involve a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 5 depicts another communication environment involving a remote network management architecture, in accordance with example embodiments.

DETAILED DESCRIPTION

Figure 1:
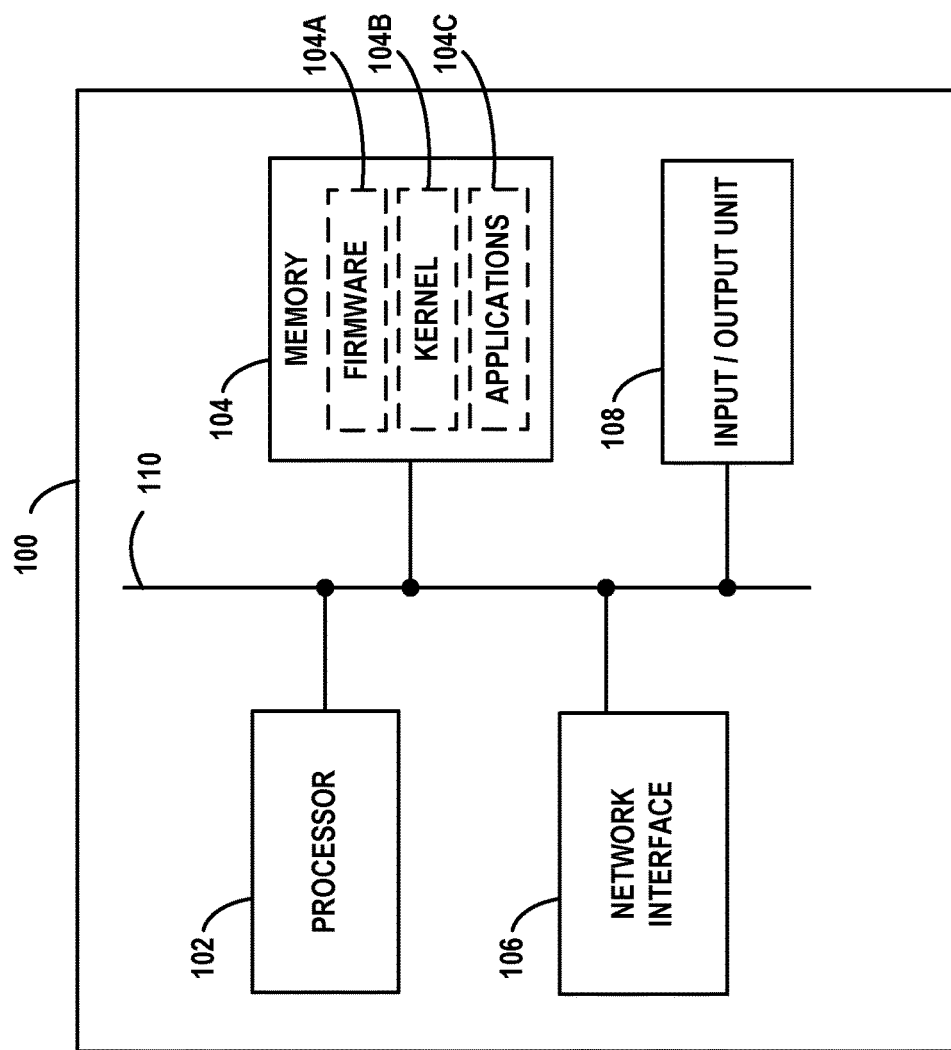
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
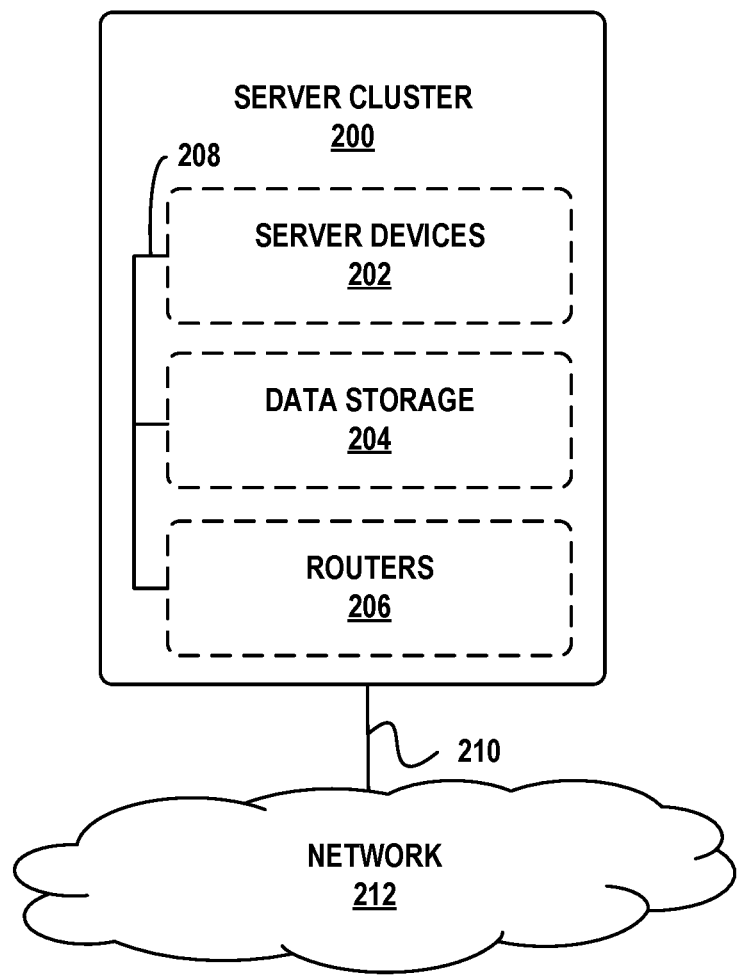
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the eXtensible Markup Language (XML), or some other standardized or proprietary format. Moreover, server devices 202 may have the capability of executing various types of computerized scripting languages, such as but not limited to Perl, Python, PUP Hypertext Preprocessor (PUP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
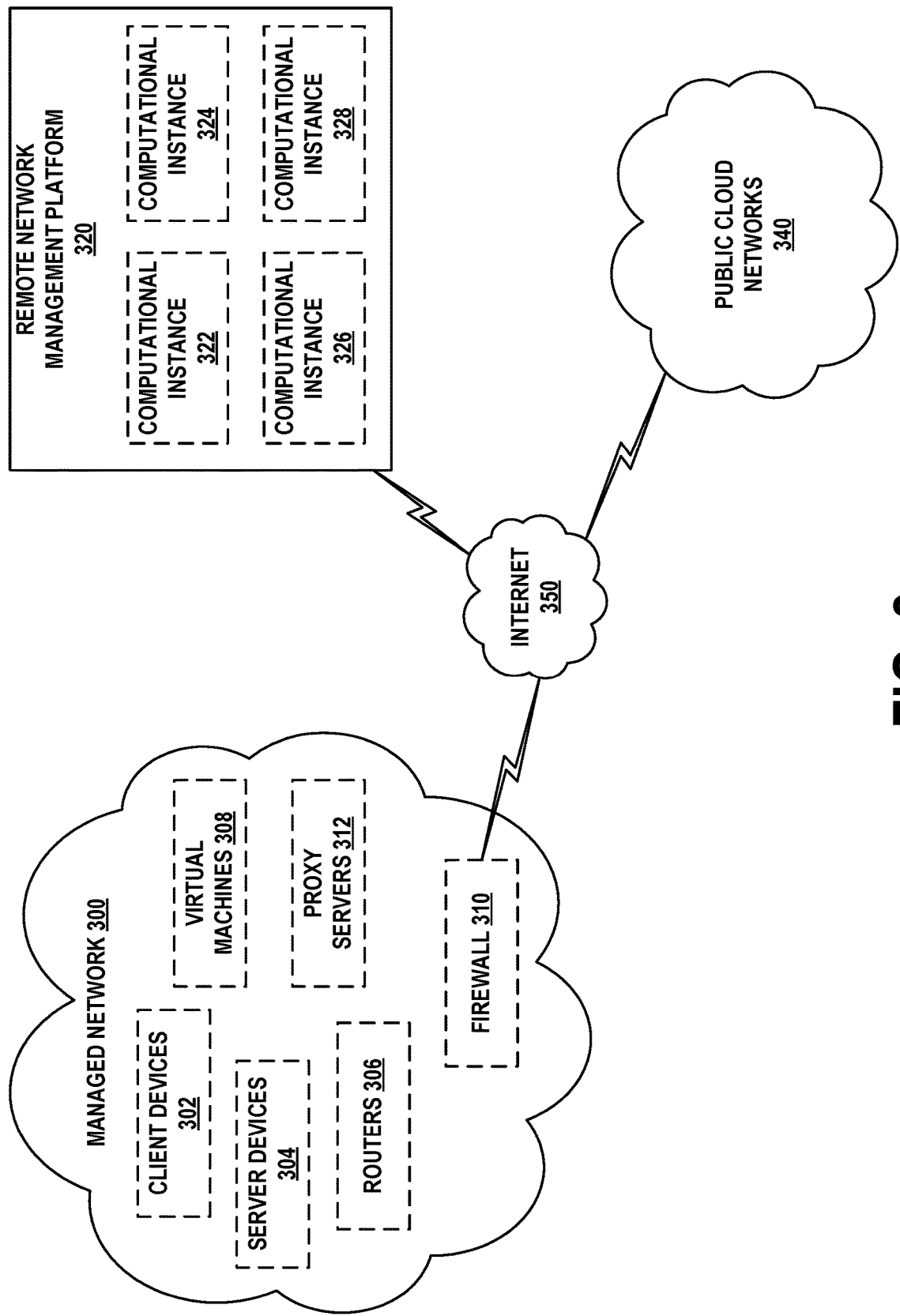
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
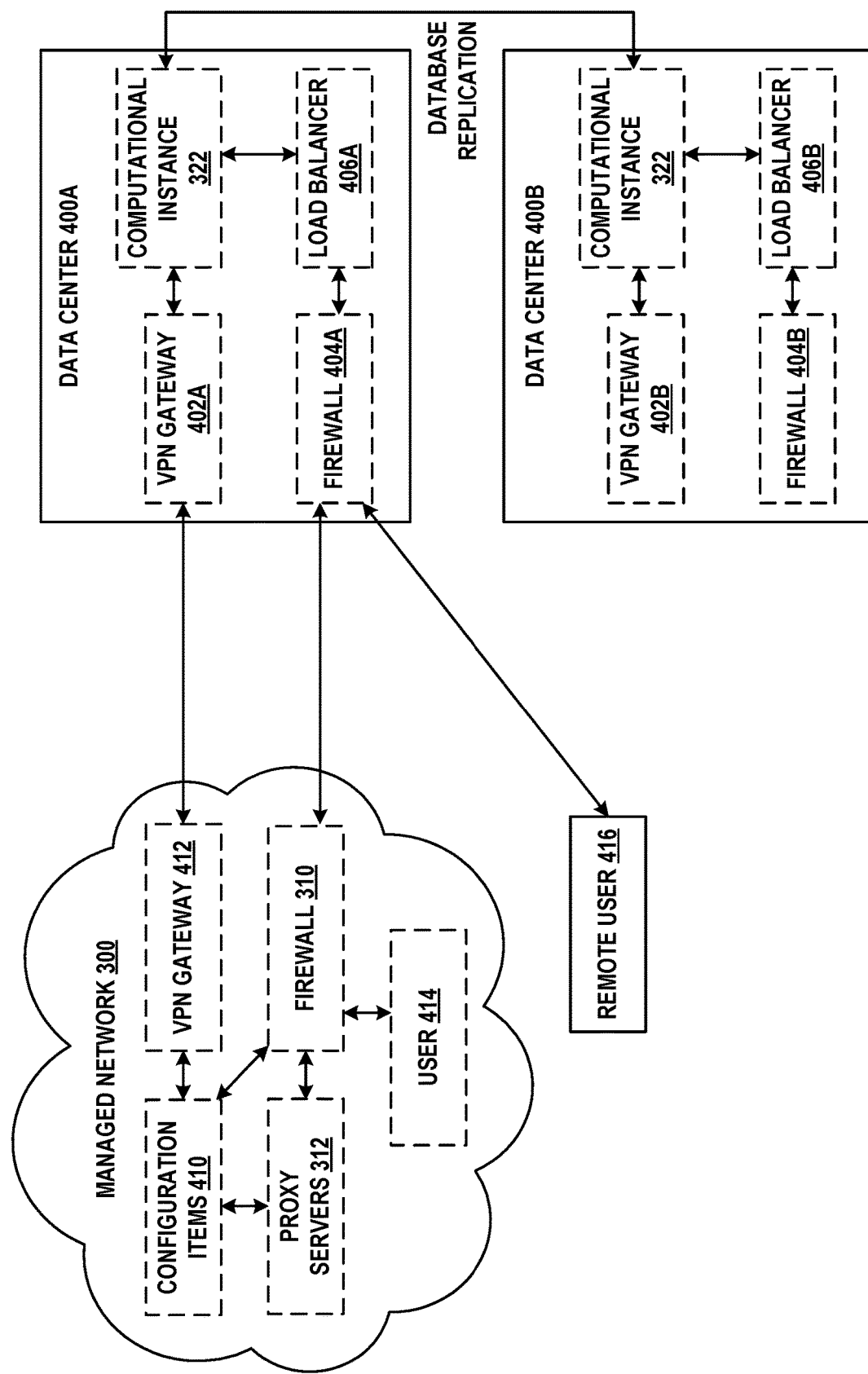
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. EXAMPLE DISCOVERY

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery—horizontal and vertical (top-down).

Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases—under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB IDENTIFICATION RULES AND RECONCILIATION

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, TRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. EXAMPLE UI AND UI COMPONENTS

Examples of UI components that may be displayed by a UI include buttons, non-editable text labels, text boxes (e.g., for text entry by a user), check boxes, radio buttons, drop-down menus or lists, list boxes with selectable list items, sliders, panels (sections of an interface that may contain other components), progress indicators (e.g., progress bars), menu bars, tool bars, tabbed controls, dialog boxes, scroll bars, image viewers (e.g., a container to display an image or icon), tooltips (e.g., a pop-up box that provides context information when hovered over or actuated), separators, cards, graphs, tables, modal windows, overlays, and so on. Some components may serve as containers for other components (e.g., panels as noted above, or list boxes containing list items).

Figure 6A:
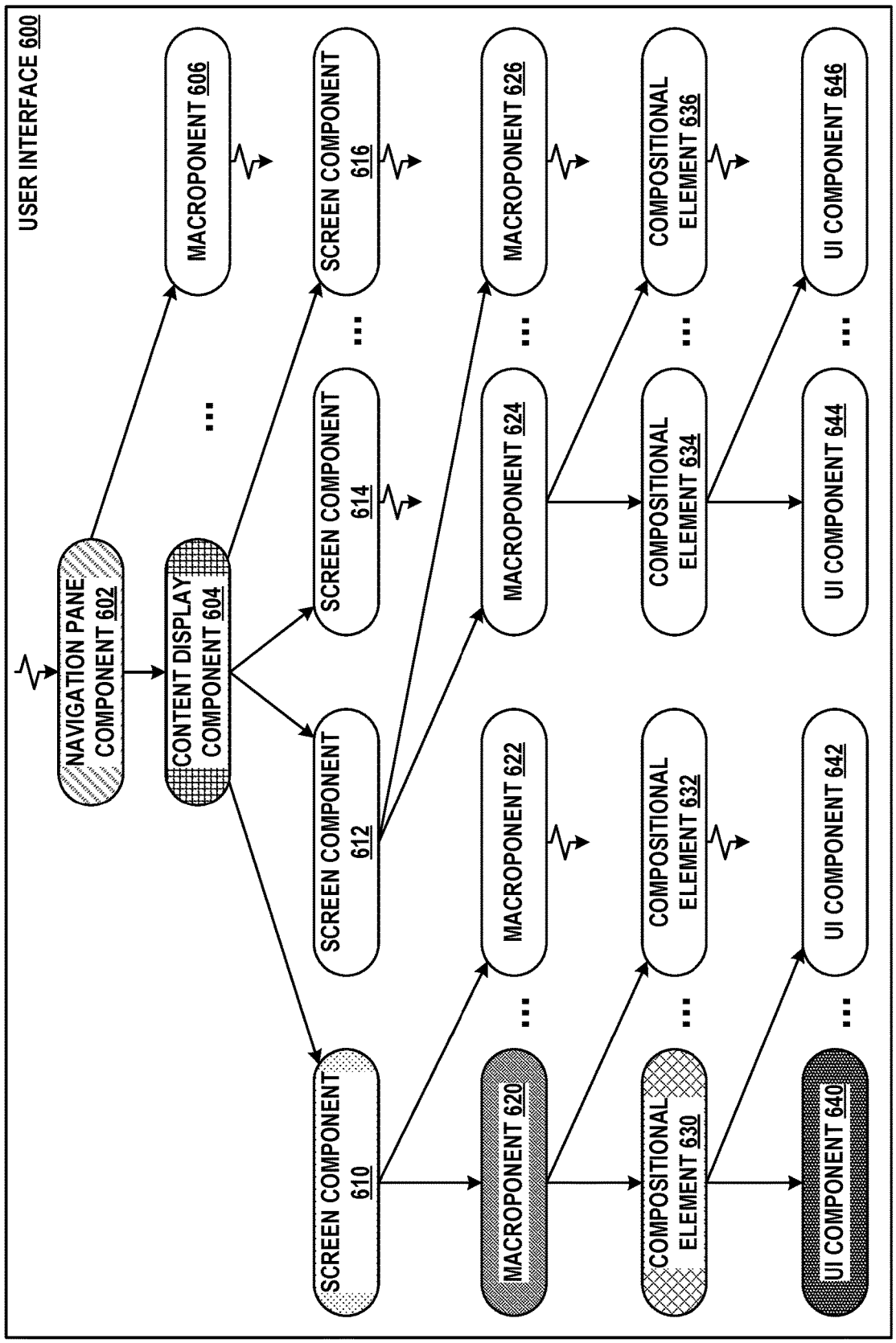
FIGS. 6A and 6B depict aspects of a user interface, in accordance with example embodiments.
Figure 6B:
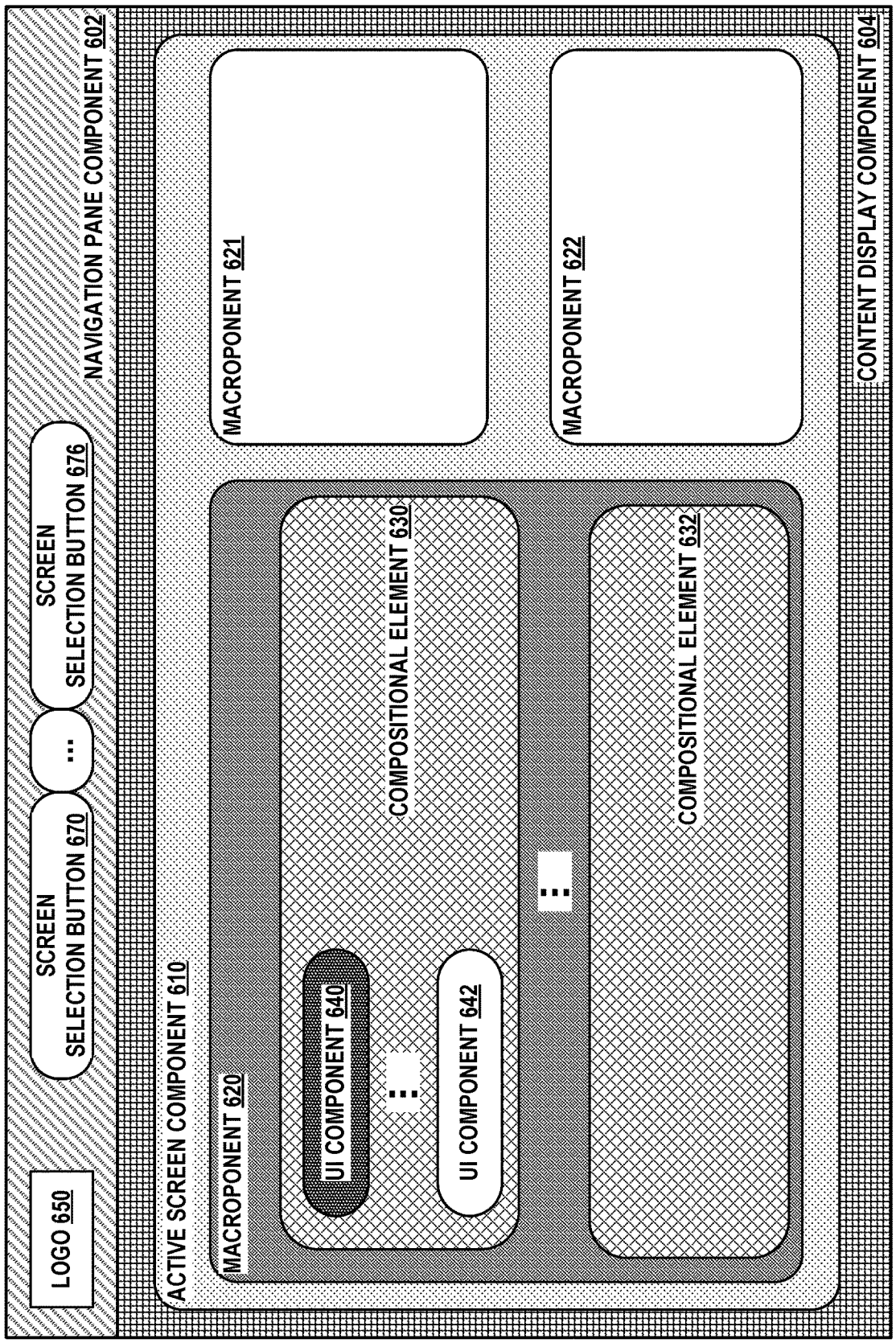

FIGS. 6A and 6B illustrate aspects of an example UI 600. Specifically, FIG. 6A illustrates aspects of a document object model (DOM) that represents, using nodes and edges, a hierarchy of components of UI 600, while FIG. 6B provides a graphical representation of portions of UI 600. UI 600 may include one or more of any of the example UI components noted above. It may be desirable to generate a component selector of a given component of UI 600 to allow the given component to be repeatably, consistently, and/or uniquely identified within different instantiations (e.g., renderings) of UI 600.

Turning to FIG. 6A, UI 600 may include navigation pane component 602, content display component 604, screen components 610, 612, and 614 through 616 (i.e., screen components 610-616), macroponent 606, macroponents 620 through 622 (i.e., macroponents 620-622), macroponents 624 through 626 (i.e., macroponents 624-626), compositional elements 630 through 632 (i.e., compositional elements 630-632), compositional elements 634 through 636 (i.e., compositional elements 634-636), UI components 640 through 642 (i.e., UI components 640-642), and UI components 644 through 646 (i.e., UI components 644-646).

Navigation pane component 602 may be a parent of content display component 604 (and thus content display component 604 may be a child of navigation pane component 602). Navigation pane component 602 may itself be a child of another node of the DOM of UI 600 (e.g., a top-level "document" node), as indicated by the broken arrow leading into navigation pane component 602. Alternatively, in some implementations, navigation pane component 602 and content display component 604 may be siblings (i.e., located at the same level of a hierarchy of the DOM of UI 600).

Content display component 604 may be a parent of each of screen components 610-616. Each of screen components 610-616 may be independently and/or individually displayable in content display component 604, and may represent a corresponding subset of UI 600. For example, each of screen components 610-616 may represent a corresponding web page, web view, workspace, application, and/or other subset of UI 600. Thus, screen components 610-616 may partition at least part of UI 600 into visually separate, and therefore more easily navigable, portions. Navigation pane component 602 and/or content display component 604 may provide controls that allow a user to switch between different screen components of screen components 610-616.

Screen component 610 may be a parent of macroponents 620-622, and screen component 612 may be a parent of macroponents 624-626. Similarly, each of screen components 614 and 616 may be a parent of corresponding macroponents, as indicated by the broken arrows emanating therefrom. In some implementations, one or more of screen components 610-616 may be subdivided into tabs, each of which may include as its children corresponding one or more macroponents. Each of macroponents 620-626 may be a reusable component that facilitates definition of UI 600, and may define a composition of a corresponding portion of its parent screen component. For example, a respective macroponent may define a layout, color, text font, text size, data resources, event information, and/or other compositional properties, and may thus operate as a customizable template used in generating UI 600. By using macroponents 620-626 across multiple UIs, these UIs may be designed to have a uniform and/or similar look-and-feel, thus facilitating user interaction therewith.

Macroponents 620-626 may be differentiated from other components of UI 600 using the names and/or identifiers thereof, which may include a predetermined string such as "macroponent" and/or "macro-component," among other possibilities. Macroponents may be used by a UI framework that generated UI 600 to facilitate definition and/or generation of UI 600, and may be present in some or all UIs generated by the UI framework. Thus, macroponents 620-626 may provide a consistent reference point relative to which UI components 640-646 may be identified and/or located.

Macroponent 620 may be a parent of compositional elements 630-632, and macroponent 624 may be a parent of compositional elements 634-636. Similarly, macroponents 622 and 626 may each be a parent of corresponding compositional elements, as indicated by the broken arrows emanating therefrom. Compositional element 630 may be a parent of UI components 640-642, and compositional element 634 may be a parent of UI components 644-646. Similarly, compositional elements 632 and 636 may each be a parent of corresponding UI components, as indicated by the broken arrows emanating therefrom.

Each of compositional elements 630-636 may define at least a layout of its corresponding child UI components. In some implementations, each respective compositional element of compositional elements 630-636 may be associated with a predefined string assigned to the respective compositional element by the UI framework that generated UI 600. For example, a name of each of compositional elements 630-636 may be associated with a predetermined prefix or suffix, which may be unique to the UI framework, and may thus allow compositional elements to be easily and quickly identified in any UI generated by the UI framework. Thus, compositional elements 630-636 may provide another consistent reference point relative to which UI components 640-646 may be identified and/or located.

In some cases, one or more of UI components 640-646 may be leaves of the DOM, and thus might not include any additional UI components depending therefrom. In other cases, one or more of UI components 640-646 may include additional UI components depending therefrom. Additionally, in some cases, UI 600 may include one or more intermediate components (not shown) between content display component 604 and screen components 610-616, between screen components 610-616 and macroponents 620-626 (e.g., a macroponent parent component that is a child of screen component 610 and a parent of macroponent 620), between macroponents 620-626 and compositional elements 630-636 (e.g., a compositional parent component that is a child of macroponent 620 and a parent of compositional element 630), and/or between compositional elements 630-636 and UI components 640-646 (e.g., a UI parent component that is a child of compositional element 630 and a parent of UI component 640).

Turning to FIG. 6B, a subset of the DOM of UI 600 is represented graphically, with corresponding components indicated using corresponding fill patterns. Navigation pane component 602 may occupy a first portion of UI 600, and may provide UI components that allow for navigation of UI 600. For example, navigation pane component 602 may include logo 650 and screen selection buttons 670 through 676 (i.e., screen selection buttons 670-676) configured to provide for selection of the screen to be displayed by content display component 604. Screen selection button 670 may be configured to instruct content display component 604 to display screen component 610, screen selection button 676 may be configured to instruct content display component 604 to display screen component 616, and other screen selection buttons (indicated by the ellipsis) may be configured to instruct content display component 604 to display other corresponding screen components.

In some implementations, content display component 604 may be configured to display each of screen components 610-616 independently and/or individually (e.g., one at a time). For example, FIG. 6B illustrates content display component 604 displaying (active) screen component 610. Alternatively, content display component 604 may include multiple display portions, each of which may be configured to independently and/or individually display a corresponding screen component, and/or UI 600 may include multiple content display components, each of which may be configured to individually display a corresponding screen component. Navigation pane component 602 (or at least portions thereof) may remain constant (e.g., in its position and/or appearance) as the screen components displayed by content display component 604 changes.

Active screen component 610 may include macroponent 620 spanning a first portion thereof, macroponent 621 (indicated by the ellipsis in FIG. 6A) spanning a second portion thereof, and macroponent 622 spanning a third portion thereof. Macroponents 620, 621, and 622 may thus partition active screen component 610 into three disjoint sections, thereby defining at least part of a composition of active screen component 610. Macroponent 620 may include compositional element 630 spanning a first portion thereof and compositional element 632 spanning a second portion thereof. Compositional element 630 may include UI components 640-642, and may specify a layout thereof within macroponent 620.

It may be desirable to generate component selectors for components of UI 600, including any one of the DOM nodes shown in FIG. 6A. A component selector may be an alphanumeric string that identifies a corresponding UI component. The component selector may be unique at least within a context of the UI based on which it is generated, and may thus allow the corresponding UI component to be located within this UI across rendering of the UI.

For example, it may be desirable to generate a component selector for UI component 640 that allows UI component 640 to be uniquely identified within UI 600 over time. The component selector may be used, for example, as part of a guided tour/walkthrough of UI 600. In general, the component selector may be generated based on and/or in response to selection of UI component 640 from a first instantiation of UI 600, and may subsequently be used to locate UI component 640 within additional instantiations of UI 600.

In some implementations, UI 600 may be generated by a static UI framework configured to assign static identifiers to the UI components of UI 600. For example, the identifier of the UI component may include the "id" attribute of an HTML element. An identifier (or portion of an identifier) may be considered static if it remains constant over time, such as across presentations/renderings of UI 600 at different times and/or for different users. Accordingly, the static identifier of a respective UI component may be used to generate at least part of the component selector of the respective UI component.

In other cases, UI 600 may be generated by a dynamic UI framework that assigns dynamic identifiers to one or more UI components. An identifier (or portion of an identifier) may be considered dynamic if it changes over time. Accordingly, the dynamic identifier of a respective UI component might not be usable to generate the component selector of the respective UI component. In further cases, a UI component may include both a static identifier portion and a dynamic identifier portion, and the static identifier portion, but not the dynamic identifier portion, may be used to generate the component selector.

Further, some UIs may include multiple instantiations of a given UI component. For example, each of screen components 610-616 may reuse some of the same macroponents, compositional elements, and/or UI components. Thus, even if the UI component includes a static identifier or a static identifier portion, this static identifier may, by itself, be insufficient to generate a component selector that is unique within a given UI. For example, the identifier of the given UI component that includes both a static portion and a dynamic portion may uniquely identify the given UI component in each instantiation of the given UI, but the dynamic portion may change over time and the static portion itself might not be unique in the context of the UI. Thus, while usage of dynamic identifiers may allow more flexibility in generating UIs with a large number of components, it may also make it more challenging to generate unique component selectors.

Further, some UI frameworks may be configured to expand the DOM as additional portions of a given UI are requested to be viewed, and this expansion of the DOM may increase the probability of a static identifier portion being non-unique. For example, once a respective screen component of screen components 610-616 is obtained and loaded into the DOM of UI 600 (e.g., in response to a user request), the respective screen component may remain a part of the DOM while UI 600 is being used. That is, the respective screen component may be cached in the DOM, and may thus be displayed in near-real time by accessing a corresponding portion of the DOM rather than requesting a new/updated version of the respective screen component from, for example, a server device. Accordingly, as additional screen components are loaded into the DOM over the course of usage of UI 600, the likelihood of two or more UI components sharing a common static identifier portion increases, thus making generation of unique component selectors more difficult.

VII. EXAMPLE COMPONENT SELECTION SYSTEM

Figure 7:
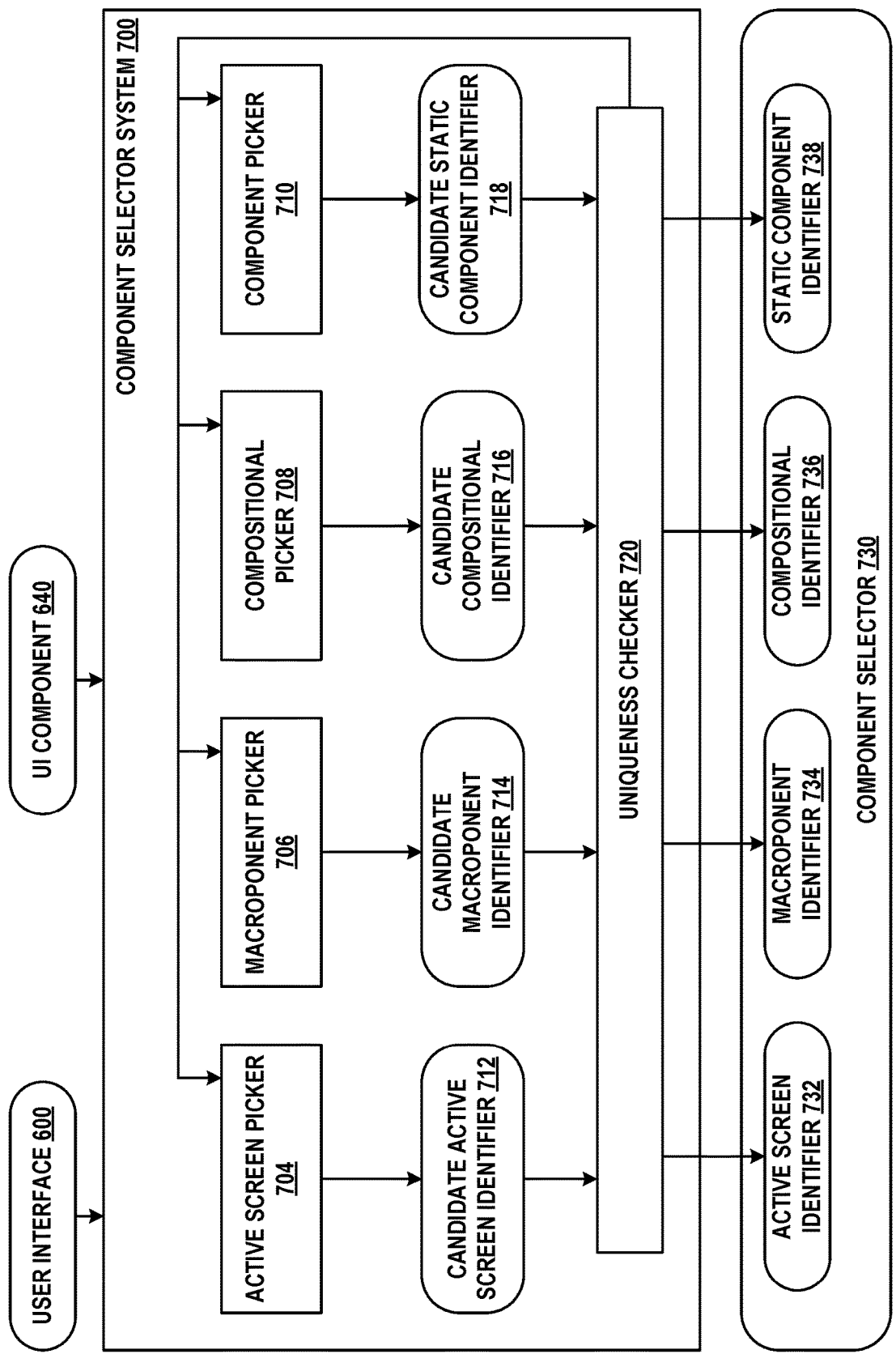
FIG. 7 depicts a component selector system, in accordance with example embodiments.

FIG. 7 illustrates an example component selector system 700 configured to generate component selector 730 for a UI component selected from UI 600. Specifically, in the illustrated example, component selector 730 corresponds to UI component 640 of UI 600. Component selector system 700 includes active screen picker 704, macroponent picker 706, compositional picker 708, component picker 710, and uniqueness checker 720. Component selector system 700 may be configured to generate component selector 730 by relying on static properties of UI 600, including the organization of UI 600 into a hierarchy of screen components, macroponents, compositional elements, and UI components, and corresponding properties thereof. Component selector system 700 and/or UI 600 may be provided and/or executed by one or more computational instances of remote network management platform 320.

In some implementations, component selector system 700 may be configured to determine component selector 730 based on and/or in response to determining an association between UI component 640 and a dynamic identifier. For example, based on a URL of UI 600, an attribute of UI 600, and/or an attribute of UI component 640, component selector system 700 may be configured to determine that UI 600 has been generated by a UI framework that utilizes dynamic identifiers. This may indicated to component selector system 700 that, for example, at least parts of the "id" attribute of UI components of UI 600 may change over time, and thus cannot be used to uniquely represent each of the UI components over time. Accordingly, rather than relying on the dynamic identifier of UI component 640, component selector system 700 may instead assemble component selector 730 based on static properties of UI component 640 and/or its parent components.

Component picker 710 may be configured to determine candidate static component identifier 718 based on UI 600 and UI component 640. Compositional picker 708 may be configured to determine candidate compositional identifier 716 (e.g., corresponding to compositional element 630) based on UI 600 and UI component 640. Macroponent picker 706 may be configured to determine candidate macroponent identifier 714 (e.g., corresponding to macroponent 620) based on UI 600 and UI component 640. Active screen picker 704 may be configured to determine candidate active screen identifier 712 based on UI 600 and UI component 640.

Uniqueness checker 720 may be configured to determine whether candidate active screen identifier 712, candidate macroponent identifier 714, candidate compositional identifier 716, candidate static identifier 718, (i.e., candidate identifiers 712-718) and/or one or more combinations thereof are sufficient to uniquely identify UI component 640 within UI 600. When candidate identifiers 712-718 and/or combinations thereof do not uniquely identify UI component 640, uniqueness checker 720 may be configured to cause pickers 706, 706, 708, and/or 710 to generate updated candidate identifiers 712-718.

Figure 8A:
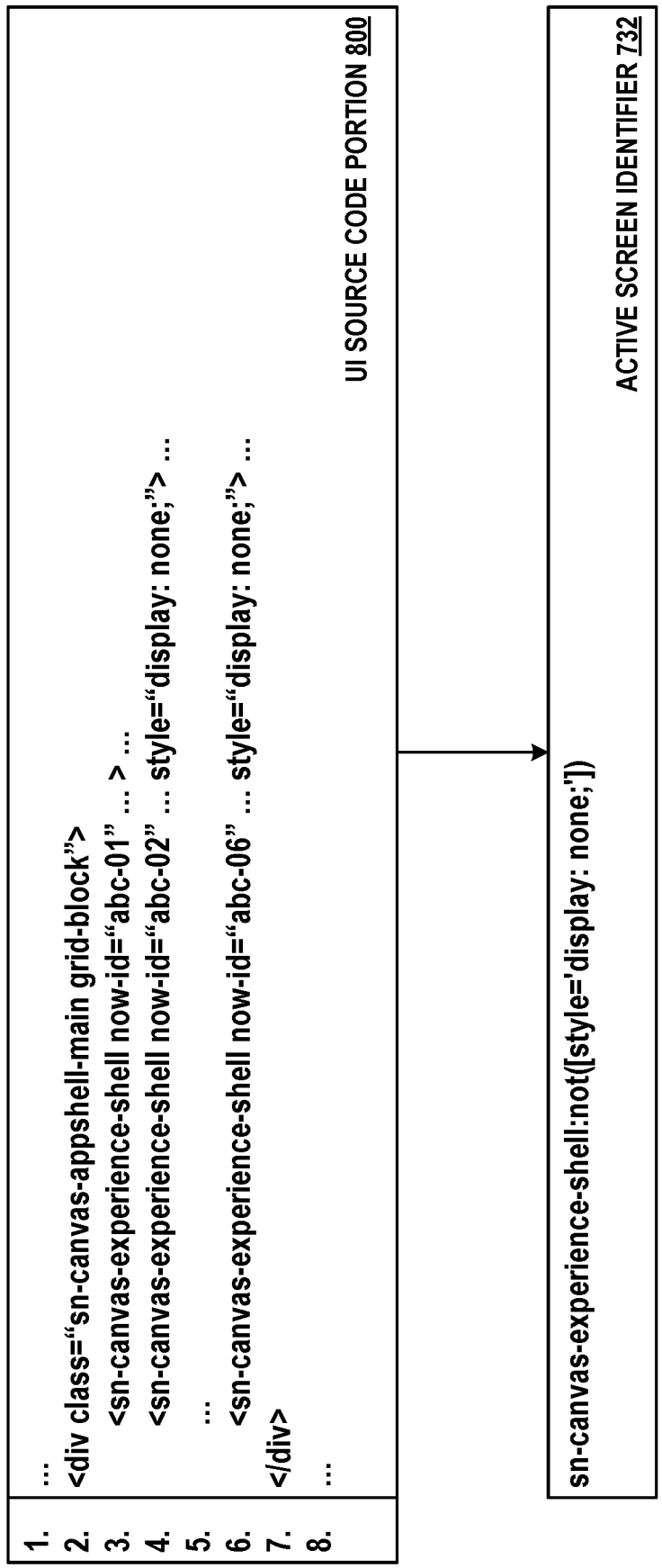
FIGS. 8A, 8B, 8C, and 8D depict portions of UI source code and corresponding component selector portions, in accordance with example embodiments.
Figure 8B:
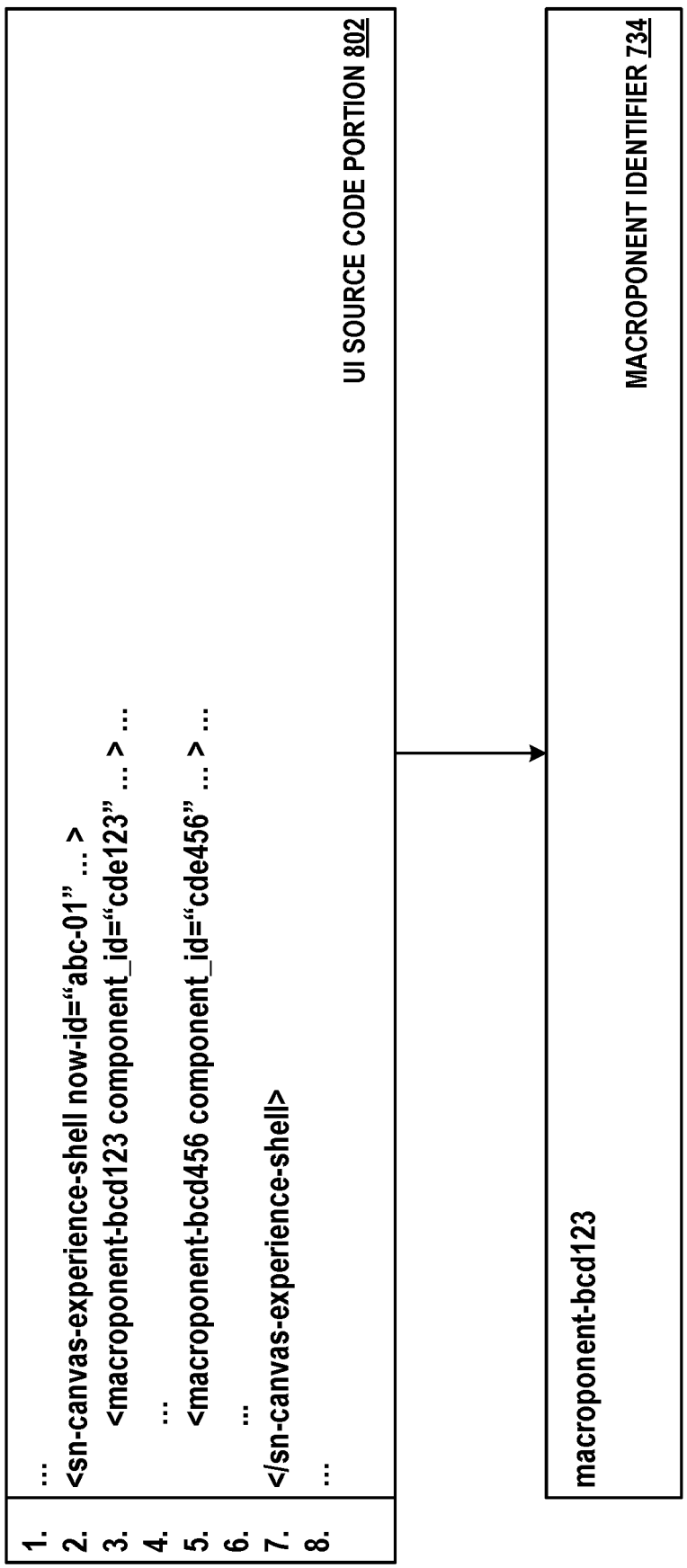
Figure 8C:
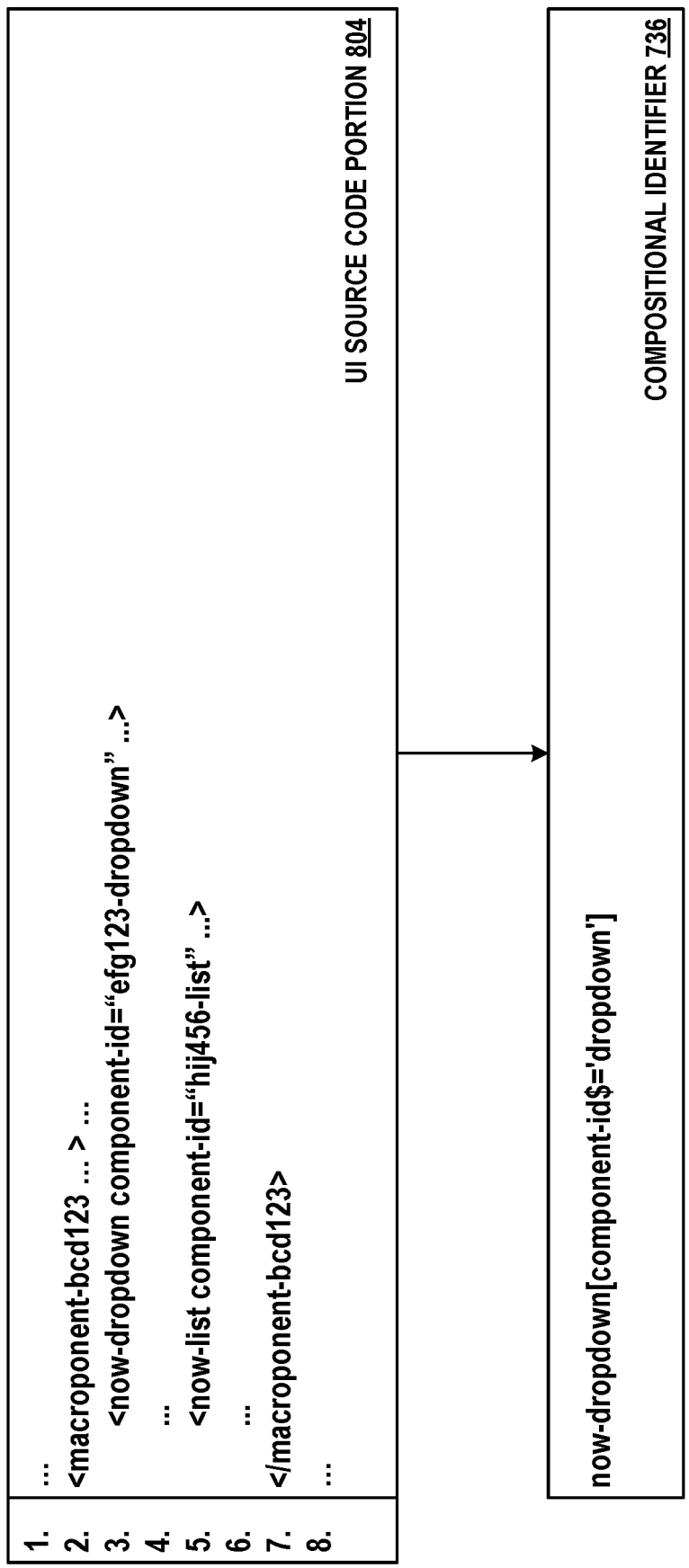
Figure 8D:
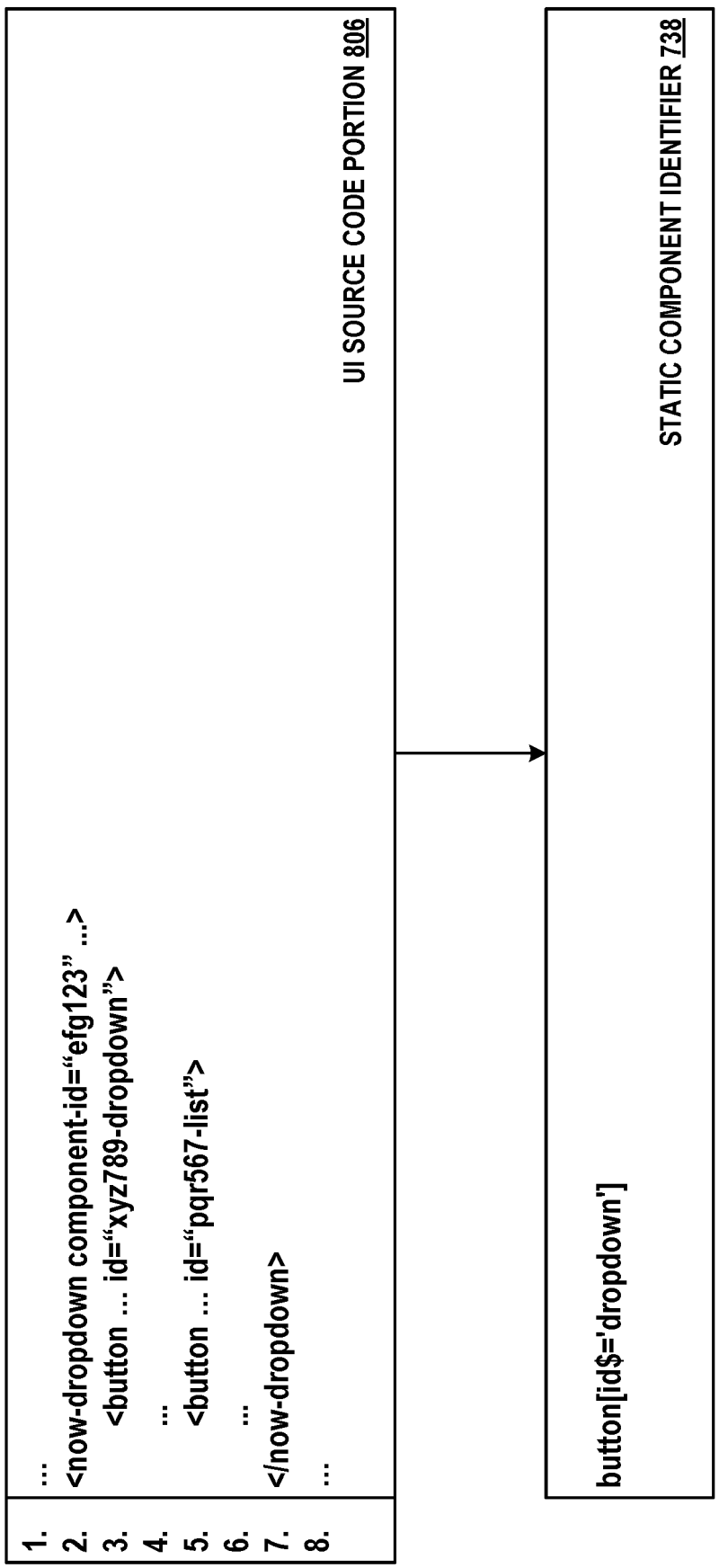

Specifically, component picker 710 may determine candidate static component identifier 718 based on one or more static properties (e.g., a name, a static attribute value, and/or a static portion of an identifier) of UI component 640. Based on candidate static component identifier 718 and candidate compositional identifier 716, uniqueness checker 720 may be configured to determine whether candidate static component identifier 718 is unique within a context of compositional element 630, which is represented by candidate compositional identifier 716. If candidate static component identifier 718 is unique within a context of compositional element 630, uniqueness checker 720 may be configured to use candidate static component identifier 718 to generate static component identifier 738 (e.g., static component identifier 738 may be assigned the value of candidate static component identifier 718). FIG. 8D illustrates additional aspects of the determination of static component identifier 738.

If candidate static component identifier 718 is not unique within a context of compositional element 630, uniqueness checker 720 may be configured to cause component picker 710 to determine an updated version of candidate static component identifier 718. Component picker 710 may be configured to determine the updated version of candidate static component identifier 718 by adding to the initial value thereof one or more static identifier portions of one or more parent UI components of UI component 640 that are also children of compositional element 630. That is, UI component 640 may be disambiguated from other children of compositional element 630 using the static identifier portions of one or more parent components that UI component 640 does not share with the other children, thus specifying a unique path from compositional element 630 to UI component 640.

For example, when compositional element 630 includes UI components 640 and 642, and each is associated with the same name and/or static component identifier portion, component picker 710 may disambiguate UI component 640 from UI component 642 by appending, to the static component identifier portion of UI component 640, the static identifier portion of a parent component of UI component 640 that is not also a parent of UI component 642. Additionally or alternatively, component picker 710 may disambiguate UI component 640 from UI component 642 by appending, to the static component identifier portion of UI component 640, a representation of an ordinal position of UI component 640 relative to compositional element 630. For example, the representation of the ordinal position may indicate that UI component 640 is a first child of compositional element 630, thus disambiguating UI component 640 from UI component 642, which is a second child of compositional element 630.

Compositional picker 710 may determine candidate compositional identifier 716 based on one or more static properties (e.g., a name, a static attribute value, and/or a static portion of an identifier) of compositional element 630 (which is the parent compositional element of UI component 640). Based on candidate compositional identifier 716 and candidate macroponent identifier 714, uniqueness checker 720 may be configured to determine whether candidate compositional identifier 716 is unique within a context of macroponent 620, which is represented by candidate macroponent identifier 714. If candidate compositional identifier 716 is unique within a context of macroponent 620, uniqueness checker 720 may be configured to use candidate compositional identifier 716 to generate compositional identifier 736 (e.g., compositional identifier 736 may be assigned the value of candidate compositional identifier 716). FIG. 8C illustrates additional aspects of the determination of compositional identifier 736.

If candidate compositional identifier 716 is not unique within a context of macroponent 620, uniqueness checker 720 may be configured to cause compositional picker 708 to determine an updated version of candidate compositional identifier 716. Compositional picker 708 may be configured to determine the updated version of candidate compositional identifier 716 by adding to the initial value thereof one or more static identifier portions of one or more parent UI components of compositional element 630 that are also children of macroponent 620. That is, compositional element 630 may be disambiguated from other children of macroponent 620 using the static identifier portions of one or more parent components that compositional element 630 does not share with the other children, thus specifying a unique path from macroponent 620 to compositional element 630.

For example, when macroponent 620 includes compositional elements 630 and 632, and each is associated with the same name and/or static compositional identifier portion, compositional picker 708 may disambiguate compositional element 630 from compositional element 632 by appending, to the static compositional identifier portion of compositional element 630, the static identifier portion of a parent component of compositional element 630 that is not also a parent of compositional element 632. Additionally or alternatively, compositional picker 708 may disambiguate compositional element 630 from compositional element 632 by appending, to the static compositional identifier portion of compositional element 630, a representation of an ordinal position of compositional element 630 relative to macroponent 620. For example, the representation of the ordinal position may indicate that compositional element 630 is a first child of macroponent 620, thus disambiguating compositional element 630 from compositional element 632, which is a second child of macroponent 620.

Macroponent picker 706 may determine candidate macroponent identifier 714 based on one or more static properties (e.g., a name, a static attribute value, and/or a static portion of an identifier) of macroponent 620 (which is the parent macroponent of compositional element 630). Based on candidate macroponent identifier 714 and candidate active screen identifier 712, uniqueness checker 720 may be configured to determine whether candidate macroponent identifier 714 is unique within a context of active screen component 610, which is represented by candidate active screen identifier 712. If candidate macroponent identifier 714 is unique within a context of active screen component 610, uniqueness checker 720 may be configured to use candidate macroponent identifier 714 to generate macroponent identifier 734 (e.g., macroponent identifier 734 may be assigned the value of candidate macroponent identifier 714). FIG. 8B illustrates additional aspects of the determination of macroponent identifier 734.

If candidate macroponent identifier 714 is not unique within a context of active screen component 610, uniqueness checker 720 may be configured to cause macroponent picker 706 to determine an updated version of candidate macroponent identifier 714. Macroponent picker 706 may be configured to determine the updated version of candidate macroponent identifier 714 by adding to the initial value thereof one or more static identifier portions of one or more parent UI components of macroponent 620 that are also children of active screen component 610. That is, macroponent 620 may be disambiguated from other children of active screen component 610 using the static identifier portions of one or more parent components that macroponent 620 does not share with the other children, thus specifying a unique path from active screen component 610 to macroponent 620.

In some implementations, the UI framework may be configured to assign unique names and/or identifiers to macroponents. In such cases, uniqueness checker 720 may be configured to assign the value of candidate macroponent identifier 714 to macroponent identifier 734 without verification that candidate macroponent identifier 714 is unique in the context of active screen component 610.

Active screen picker 704 may determine candidate active screen identifier 712 based on one or more static properties (e.g., a name, a static attribute value, and/or a static portion of an identifier) of active screen component 610 (which is the parent screen component of macroponent 620) and/or one or more tabs present therein. Based on candidate active screen identifier 712, uniqueness checker 720 may be configured to determine whether candidate active screen identifier 712 is unique within a context of UI 600. If candidate active screen identifier 712 is unique within a context of UI 600, uniqueness checker 720 may be configured to use candidate active screen identifier 712 to generate active screen identifier 732 (e.g., active screen identifier 732 may be assigned the value of candidate active screen identifier 712). FIG. 8A illustrates additional aspects of the determination of active screen identifier 732.

If candidate active screen identifier 712 is not unique within a context of UI 600, uniqueness checker 720 may be configured to cause active screen picker 704 to determine an updated version of candidate active screen identifier 712. Active screen picker 704 may be configured to determine the updated version of candidate active screen identifier 712 by adding to the initial value thereof one or more static identifier portions of one or more parent UI components of active screen component 610. For example, active screen component 610 may include a plurality of tabs as its children, and each tab may be configured to display a corresponding subset of the contents of active screen component 610. Thus, the initial value of candidate active screen identifier 712 may be based on a tab to which macroponent 620 belongs. Multiple instantiations of this tab may form part of multiple different screen components in the DOM of UI 600, and thus the tab containing macroponent 620 may be disambiguated from other tabs by adding, to the initial value of candidate active screen identifier 712, one or more static properties (e.g., a name, a static attribute value, and/or a static portion of an identifier) of active screen component 610.

In some implementations, the UI framework may be configured to structure each UI generated thereby using a hierarchy of screen components, macroponents, compositional elements, and UI components (e.g., as shown in FIG. 6A). For example, each UI may include one or more screen components, each of which includes as children thereof one or more macroponents, each of which includes as children thereof one or more compositional elements, each of which includes as children thereof one or more UI components. Accordingly, each of these component types may serve as a reference and/or anchor point that is present within every UI generated by the UI framework, and can thus be used to divide the UI into successively smaller subsets that lead to the selected UI component.

Thus, component selector system 700 may be configured to determine whether a given UI has been generated by the UI framework, and may be configured to generate component selector 730 based on and/or in response to this determination. Because UIs generated by the UI framework may always include screen components, macroponents, compositional elements, and UI components, component selector system 700 may be able to identify each of identifiers 732-738 within the given UI to generate a unique component selector 730 for any component of a given UI. By utilizing a predetermined hierarchy of components of UI 600, component selector system 700 may be able to generate component selectors that are shorter and/or less likely to (e.g., guaranteed not to) result in ambiguities and/or collisions.

Component selector 730 may be determined by combining two or more of identifiers 732-738. For example, component selector 730 may be based on a concatenation of two or more of identifiers 732-738. One or more predetermined characters (e.g., a space, hyphen, period, etc.) may be used to separate the two or more of identifiers 732-738 from one another, such that component selector 730 is separable into the individual identifiers that were used to generate component selector.

VIII. EXAMPLE COMPONENT SELECTOR

FIGS. 8A, 8B, 8C, and 8D illustrate example UI source code portions and corresponding component selector portions of component selector 730 determined based on the UI source code portions. Although FIGS. 8A, 8B, 8C, and 8D show the example UI source code expressed using HTML, it is to be understood that the UI described herein may be expressed using a plurality of different mark-up and/or programming languages.

FIG. 8A illustrates UI source code portion 800 that includes source code representing screen components 610-616 of UI 600. For example, line 3 of UI source code portion 800 may represent screen component 610, line 4 may represent screen component 612, and line 6 may represent screen component 616. Each of lines 3, 4, and 6 may be expanded to reveal additional source code representing the child components of each of the corresponding screen components 610-616.

Active screen identifier 732 may include the string "sn-canvas-experience-shell:not([style='display: none;'])" corresponding to line 3, where "sn-canvas-experience-shell" denotes a screen component and "not([style='display: none;'])" indicates that the screen component to be selected is actively being displayed (i.e., it lacks the attribute "style='display: none;'"). Thus, active screen identifier 732 indicates that the UI component represented by component selector 730 is a subset of an actively-displayed screen component, which in the shown example is screen component 610 represented by line 3 of UI source code portion 800. In other words, active screen identifier 732 narrows down the search space for the selected component to the actively-displayed screen component.

FIG. 8B illustrates UI source code portion 802 that includes source code representing macroponents 620-622 of screen component 610 of UI 600. For example, line 3 of UI source code portion 802 may represent macroponent 620, and line 5 may represent macroponent 622. Thus, lines 3-6 of UI source code portion 802 represent an expansion of line 3 of UI source code portion 800. Each of lines 3 and 5 may be expanded to reveal additional source code representing the child components of each of the corresponding macroponents 620-622.

Macroponent identifier 734 may include the string "macroponent-bcd123" corresponding to line 3 and representing macroponent 620. Each macroponent of a given screen component may be assigned a name that includes a predetermined string (e.g., "macroponent") and is unique within at least a context of the given screen (and possibly globally as well), and the name may be static. Thus, the (static) name "macroponent-bcd123" of macroponent 620 may be unique at least within a context of screen component 610, and may thus uniquely identify a subset of screen component 610 within which to search for the UI component represented by component selector 730. Thus, macroponent identifier 734 in combination with active screen identifier 732 indicates that the UI component represented by component selector 730 is a subset of actively-displayed screen component 610 and a subset of macroponent 620. Thus, macroponent identifier 734 further narrows down the search space for the selected component to macroponent 620.

FIG. 8C illustrates UI source code portion 804 that includes source code representing compositional elements 630-632 of macroponent 620 of UI 600. For example, line 3 of UI source code portion 804 may represent compositional element 630, and line 5 may represent compositional element 632. Thus, lines 3-6 of UI source code portion 804 represent an expansion of line 3 of UI source code portion 802. Each of lines 3 and 5 may be expanded to reveal additional source code representing the child components of each of the corresponding compositional elements 630-632.

Compositional identifier 736 may include the string "now-dropdown[component-id$='dropdown']" corresponding to line 3 and representing compositional element 630. Each compositional element may be assigned a name that, for example, starts with the prefix "now-," thus allowing compositional elements to be distinguished from other types of elements and/or components. The string portion "now-dropdown" may indicate to select a compositional element having a type of "dropdown," while the string portion "[component-id$='dropdown']" may further indicate that the compositional element has a static identifier portion represented by the string "dropdown" (and may also have a dynamic identifier portion "efg123," which is ignored). Thus, compositional identifier 736 in combination with active screen identifier 732 and macroponent identifier 734 indicates that the UI component represented by component selector 730 is a subset of the actively-displayed screen component 610, a subset of macroponent 620, and a subset of compositional element 630. Thus, compositional identifier 736 further narrows down the search space for the selected component to compositional element 630.

FIG. 8D illustrates UI source code portion 806 that includes source code representing UI components 640-642 of compositional element 630 of UI 600. For example, line 3 of UI source code portion 806 may represent UI component 640, and line 5 may represent UI component 642. Thus, lines 3-6 of UI source code portion 806 represent an expansion of line 3 of UI source code portion 804. Some of lines 3 and 5 may be expanded to reveal additional source code.

Static component identifier 738 may include the string "button[id$='dropdown']" corresponding to line 3 and representing UI component 640. Each of UI components 640-642 may be assigned an identifier that includes both a dynamic portion and a static portion. For example, the identifier of UI component 640 may include dynamic portion "xyz789" separated by a hyphen from static portion "dropdown." The string portion "button" may indicate to select a UI component having a type of "button," while the string portion "[id$='dropdown']" may further indicate that the UI component has a static identifier portion represented by the string "dropdown" (and may also have a dynamic identifier portion, which is ignored). Thus, static component identifier 738 in combination with active screen identifier 732, macroponent identifier 734, and compositional identifier 736 indicates that the UI component represented by component selector 730 is a subset of the actively-displayed screen component 610, a subset of macroponent 620, a subset of compositional element 630, and is a button with static identifier "dropdown." Thus, static component identifier 738 further narrows down the search space for the selected component to a single UI component, namely, UI component 640.

The complete component selector determined based on identifiers 732, 734, 736, and 738 may thus be represented by the string "sn-canvas-experience-shell:not ([style='display: none;']) macroponent-bcd123 now-dropdown[component-id$='dropdown']button [id$='dropdown']." Specifically, each of identifiers 732, 734, 736, and 738 may be concatenated together in a predetermined order and separated from one another by a space, thus allowing each of identifiers 732, 734, 736, and 738 to be individual extracted from the complete component selector.

As discussed in connection with FIG. 7, when a respective identifier of identifiers 732-738 includes an ambiguity, this ambiguity may be resolved by combining the respective identifier with one or more static properties (e.g., a name, a static attribute value, and/or a static portion of an identifier) of a parent component. For example, if static component identifier 738 were not unique, and UI component 640 was a child of a parent component "<span ... class="abc123-dropdown-label"> ... </span>," static component identifier 738 could be expanded by, for example, prepending the string "span[id$='dropdown-label']" to the string "button [id$='dropdown']." space Although the example component selector 730 described herein corresponds to a UI component that is at or near a bottom of the hierarchy of UI 600 (e.g., UI component 640 may be a leaf node of the DOM of UI 600), the same or similar approach may also be applied to UI components at different levels of the hierarchy. For example, compositional element 630 may be represented using a component identifier that includes active screen identifier 732, macroponent identifier 734, and compositional identifier 736, but excludes static component identifier 738. That is, component selector 730 may be shortened and/or lengthened as needed to indicate a shallower and/or deeper traversal of the DOM of UI 600.

Further, aspects of the hierarchy shown with respect to content display component 604 may also be present as part of navigation pane component 602. For example, navigation pane component 602 may include as its children one or more screen components, macroponents, compositional elements, and/or UI components. In some cases, the hierarchy of navigation pane component 602 may differ in some respects from the hierarchy of content display component 604. For example, navigation pane component 602 might not include screen components, but may include macroponents and the children thereof. Thus, a structure of the component selector generated in connection with navigation pane component 602 may differ from the structure of the component selector generated in connection with content display component 604.

IX. EXAMPLE TECHNICAL IMPROVEMENTS

These embodiments provide a technical solution to a technical problem. One technical problem being solved is how to uniquely identify a UI component of a UI across different renderings of the UI. In practice, this is problematic because the UI may include dynamic identifier portions that change across the different renderings of the UI, and/or any static identifier portions may be reused across multiple UI components present in the UI.

In the prior art, UI components are generally assigned static identifiers that are unique and constant over time, and can thus be used as component selectors. However, some UI frameworks rely on dynamic identifiers to provide more flexibility in designing, generating, and using the UIs. Since the dynamic identifiers change over time, they cannot readily be used as component selectors. Thus, prior art techniques did little if anything to address the need to uniquely identify UI components over time in the presence of dynamic identifiers.

The embodiments herein overcome these limitations by generating a component selector for a UI component based on static properties of the UI component and one or more parent components of the UI component. Specifically, the parent components are selected from a hierarchy of screen components, macroponents, compositional elements, and UI components utilized by the UI framework in generating UIs. In this manner, generation of unique component selectors can be accomplished in a more accurate and robust fashion. This results in several advantages. First, the component selector is independent of dynamic aspects of UI components, and is thus constant across renderings of the UI. Second, the component selector is unique at least in the context of the UI from which it is selected. Third, by relying on the hierarchy utilized by the UI framework, the resulting component selector may be shorter than alternative component selectors.

Other technical improvements may also flow from these embodiments, and other technical problems may be solved. Thus, this statement of technical improvements is not limiting and instead constitutes examples of advantages that can be realized from the embodiments.

X. EXAMPLE OPERATIONS

Figure 9:
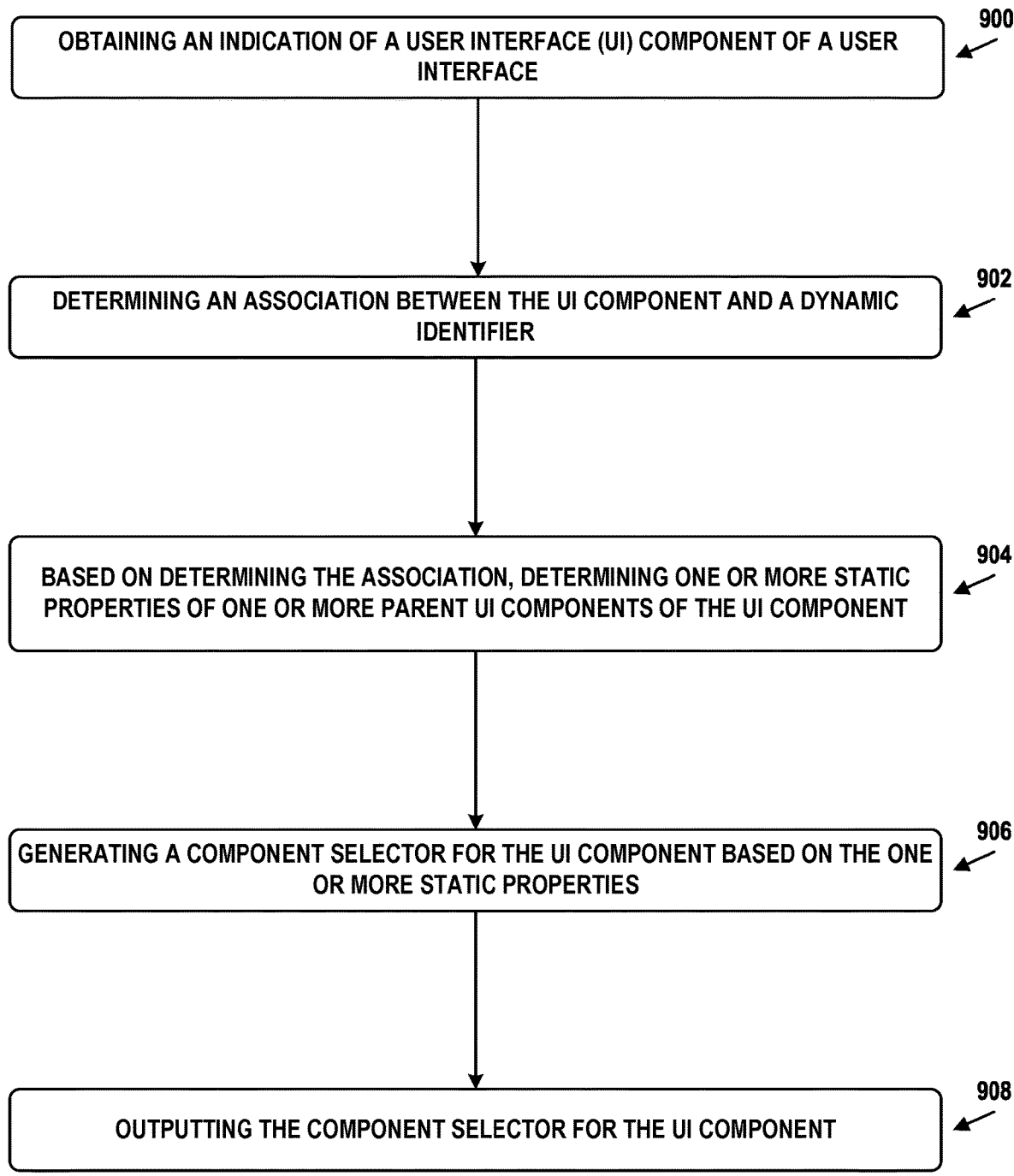
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 may involve obtaining an indication of a UI component of a user interface.

Block 902 may involve determining an association between the UI component and a dynamic identifier.

Block 904 may involve, based on determining the association, determining one or more static properties of one or more parent UI components of the UI component.

Block 906 may involve generating a component selector for the UI component based on the one or more static properties.

Block 908 may involve outputting the component selector for the UI component.

In some examples, the dynamic identifier may be configured to change across renderings of the user interface. Determining the association may include determining that the UI component includes the dynamic identifier.

In some examples, the component selector for the UI component may be exclusive of the dynamic identifier of the UI component.

In some examples, the component selector for the UI component may be unique at least within a context of the user interface.

In some examples, generating the component selector may include combining one or more static properties according to a predetermined pattern.

In some examples, the user interface may include a plurality of screens each configured to be toggled between a displayed state and a hidden state. The plurality of screens may be represented using a shared document object model (DOM). Determining the one or more static properties may include determining, based on the shared DOM, an active screen identifier associated with an active screen of the plurality of screens. The active screen may be in a displayed state and may include the UI component. The component selector may be based on the active screen identifier.

In some examples, a respective screen of the plurality of screens may include a plurality of tabs each of which may be configured to be toggled between the displayed state and the hidden state. The plurality of tabs may be represented using the shared DOM. Determining the one or more static properties may include determining, based on the shared DOM, an active tab identifier associated with an active tab of the plurality of tabs. The active tab may be in the displayed state and may include the UI component. The component selector may be based on the active tab identifier.

In some examples, the user interface may include (i) a content display portion configured to individually display each respective screen of the plurality of screens and (ii) a navigation pane that provides for selection of the active screen and remains constant as the content display portion displays different screens of the plurality of screens. Determining the one or more static properties may include determining that the UI component is part of the content display portion and, based on determining that the UI component is part of the content display portion, determining the active screen identifier associated with the active screen.

In some examples, the user interface may include (i) a content display portion configured to display one or more screens of the user interface and (ii) a navigation pane that remains constant as the content display portion displays different screens of the one or more screens. Determining the one or more static properties of the one or more parent UI components may include determining that the UI component is part of the navigation pane and, based on determining that the UI component is part of the navigation pane, determining a navigation pane identifier associated with the navigation pane. The component selector may be based on the navigation pane identifier.

In some examples, the user interface may include a screen that includes one or more macroponents configured to define a layout of contents of the screen. Determining the one or more static properties may include determining that the UI component is part of a macroponent of the one or more macroponents and, based on determining that the UI component is part of the macroponent, determining a macroponent identifier of the macroponent.

In some examples, determining the one or more static properties may include determining a compositional identifier of a compositional element that contains the UI component. The compositional element may define a layout of the UI component within a portion of the user interface. The component selector may be based on the compositional identifier.

In some examples, determining the compositional identifier may include determining that (i) the compositional element is a parent of the UI component and (ii) a name of the compositional element includes a predefined string assigned to the compositional element by a user interface framework configured to assign the dynamic identifier to the UI component.

In some examples, determining the compositional identifier may include determining that the compositional identifier is not unique in a context of a parent component that contains the compositional element and, based on determining that the compositional identifier is not unique, determining a compositional parent identifier of the parent component. The component selector may be based on the compositional identifier and the compositional parent identifier.

In some examples, the compositional parent identifier may indicate an ordinal position of the compositional element relative to the parent component.

In some examples, the one or more static properties may include at least one static property associated with the UI component. The UI component may be associated with a concatenation of (i) the dynamic identifier and (ii) a static identifier that corresponds to a first type of the UI component and is shared by different instantiations of UI components of the first type. Determining the one or more static properties may include identifying, based on the concatenation, the static identifier and determining a static component identifier based on the static identifier. The component selector may be based on the static component identifier.

In some examples, determining the static component identifier may include determining that the static identifier is not unique in a context of a compositional element that contains the UI component and, based on determining that the static identifier is not unique in the context of the compositional element, determining a parent identifier of a first parent component that contains the UI component and forms part of the compositional element. Determining the static component identifier may also include determining the static component identifier based on the parent identifier and the static identifier.

In some examples, determining the association between the UI component and the dynamic identifier may include determining, based on an attribute associated with the user interface, that the user interface has been generated by a user interface framework configured to assign the dynamic identifier to the UI component.

In some examples, a representation of the user interface may be parsed to identify one or more portions of the component selector within the representation of the user interface. Based on identifying the one or more portions of the component selector within the representation of the user interface, the UI component may be identified within the user interface.

In some examples, the component selector may be associated with a portion of a definition of a guided tour for the user interface.

In some examples, the component selector may be used to identify the UI component as part of playback of the guided tour for the user interface.

XI. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
    obtaining an indication of a user interface (UI) component of a user interface;
    determining an association between the UI component and a dynamic identifier;
    based on determining the association, determining one or more static properties of one or more parent UI components of the UI component, wherein determining the one or more static properties comprises:
        determining a compositional element that contains the UI component and is a parent of the UI component, wherein the compositional element defines a layout of the UI component within a portion of the user interface;
        determining a compositional identifier of the compositional element by determining that a name of the compositional element includes a predefined string assigned to the compositional element by a user interface framework configured to assign the dynamic identifier to the UI component, wherein the one or more static properties comprise the compositional identifier;
    generating a component selector for the UI component based on the one or more static properties, wherein the component selector is based on the compositional identifier; and
    outputting the component selector for the UI component.

2. The method of claim 1, wherein the dynamic identifier is configured to change across renderings of the user interface, and wherein determining the association comprises determining that the UI component comprises the dynamic identifier.

3. The method of claim 1, wherein the component selector for the UI component is exclusive of the dynamic identifier of the UI component.

4. The method of claim 1, wherein the component selector for the UI component is unique at least within a context of the user interface.

5. The method of claim 1, wherein generating the component selector comprises:
    combining the one or more static properties according to a predetermined pattern.

6. The method of claim 1, wherein:
    the user interface comprises a plurality of screens each configured to be toggled between a displayed state and a hidden state;
    the plurality of screens is represented using a shared document object model (DOM);

determining the one or more static properties comprises determining, based on the shared DOM, an active screen identifier associated with an active screen of the plurality of screens;

the active screen is in the displayed state and comprises the UI component; and the component selector is based on the active screen identifier.

7. The method of claim 6, wherein:

a respective screen of the plurality of screens comprises a plurality of tabs each configured to be toggled between the displayed state and the hidden state;

the plurality of tabs is represented using the shared DOM;

determining the one or more static properties comprises determining, based on the shared DOM, an active tab identifier associated with an active tab of the plurality of tabs;

the active tab is in the displayed state and comprises the UI component; and the component selector is based on the active tab identifier.

8. The method of claim 6, wherein:

the user interface comprises (i) a content display portion configured to individually display each respective screen of the plurality of screens and (ii) a navigation pane that provides for selection of the active screen and remains constant as the content display portion displays different screens of the plurality of screens;

determining the one or more static properties comprises:

determining that the UI component is part of the content display portion; and based on determining that the UI component is part of the content display portion, determining the active screen identifier associated with the active screen.

9. The method of claim 1, wherein:

the user interface comprises (i) a content display portion configured to display one or more screens of the user interface and (ii) a navigation pane that remains constant as the content display portion displays different screens of the one or more screens;

determining the one or more static properties of the one or more parent UI components comprises:

determining that the UI component is part of the navigation pane; and based on determining that the UI component is part of the navigation pane, determining a navigation pane identifier associated with the navigation pane; and the component selector is based on the navigation pane identifier.

10. The method of claim 1, wherein:

the user interface comprises a screen comprising one or more macroponents configured to define a composition of contents of the screen;

determining the one or more static properties comprises:

determining that the UI component is part of a macroponent of the one or more macroponents; and based on determining that the UI component is part of the macroponent, determining a macroponent identifier of the macroponent.

11. The method of claim 1, wherein determining the compositional identifier comprises:

determining that the compositional identifier is not unique in a context of a parent component that contains the compositional element; and based on determining that the compositional identifier is not unique, determining a compositional parent identifier of the parent component, wherein the component selector is based on the compositional identifier and the compositional parent identifier.

12. The method of claim 1, wherein the one or more static properties comprise at least one static property associated with the UI component, wherein the UI component is associated with a concatenation of (i) the dynamic identifier and (ii) a static identifier that corresponds to a first type of the UI component and is shared by different instantiations of UI components of the first type, and wherein determining the one or more static properties comprises:

identifying, based on the concatenation, the static identifier; and determining a static component identifier based on the static identifier, wherein the component selector is based on the static component identifier.

13. The method of claim 12, wherein determining the static component identifier comprises:

determining that the static identifier is not unique in a context of the compositional element;

based on determining that the static identifier is not unique in the context of the compositional element, determining a parent identifier of a first parent component that contains the UI component and forms part of the compositional element; and determining the static component identifier based on the parent identifier and the static identifier.

14. The method of claim 1, wherein determining the association between the UI component and the dynamic identifier comprises:

determining, based on an attribute associated with the user interface, that the user interface has been generated by a user interface framework configured to assign the dynamic identifier to the UI component.

15. The method of claim 1, further comprising:

parsing a representation of the user interface to identify one or more portions of the component selector within the representation of the user interface; and based on identifying the one or more portions of the component selector within the representation of the user interface, identifying the UI component within the user interface.

16. The method of claim 1, further comprising one or more of:

associating the component selector with a portion of a definition of a guided tour for the user interface; or using the component selector to identify the UI component as part of a playback of the guided tour for the user interface.

17. A non-transitory computer-readable medium, having stored thereon program instructions that, upon execution by a computing system, cause the computing system to perform operations comprising:

obtaining an indication of a user interface (UI) component of a user interface;

determining an association between the UI component and a dynamic identifier;

based on determining the association, determining one or more static properties of one or more parent UI components of the UI component, wherein determining the one or more static properties comprises:

determining a compositional element that contains the UI component and is a parent of the UI component, wherein the compositional element defines a layout of the UI component within a portion of the user interface;

determining a compositional identifier of the compositional element by determining that a name of the compositional element includes a predefined string assigned to the compositional element by a user interface framework configured to assign the dynamic identifier to the UI component, wherein the one or more static properties comprise the compositional identifier;

generating a component selector for the UI component based on the one or more static properties, wherein the component selector is based on the compositional identifier; and outputting the component selector for the UI component.

18. A system comprising:

one or more processors; and memory, containing program instructions that, upon execution by the one or more processors, cause the system to perform operations comprising:

obtaining an indication of a user interface (UI) component of a user interface;

determining an association between the UI component and a dynamic identifier;

based on determining the association, determining one or more static properties of one or more parent UI components of the UI component, wherein determining the one or more static properties comprises:

determining a compositional element that contains the UI component and is a parent of the UI component, wherein the compositional element defines a layout of the UI component within a portion of the user interface;

determining a compositional identifier of the compositional element by determining that a name of the compositional element includes a predefined string assigned to the compositional element by a user interface framework configured to assign the dynamic identifier to the UI component, wherein the one or more static properties comprise the compositional identifier;

generating a component selector for the UI component based on the one or more static properties, wherein the component selector is based on the compositional identifier; and outputting the component selector for the UI component.

19. The system of claim 18, wherein:

the user interface comprises a screen comprising one or more macroponents configured to define a composition of contents of the screen;

determining the one or more static properties comprises:

determining that the UI component is part of a macroponent of the one or more macroponents; and based on determining that the UI component is part of the macroponent, determining a macroponent identifier of the macroponent.

20. The system of claim 18, wherein determining the compositional identifier comprises:

determining that the compositional identifier is not unique in a context of a parent component that contains the compositional element; and based on determining that the compositional identifier is not unique, determining a compositional parent identifier of the parent component, wherein the component selector is based on the compositional identifier and the compositional parent identifier.

* * * * *